United States Patent

Hurst et al.

[11] Patent Number: 5,811,947
[45] Date of Patent: Sep. 22, 1998

[54] TESTING AND SPEED CONTROL OF ELECTRIC MOTORS IN VEHICLES HAVING ELECTRONICALLY CONTROLLED BRAKING SYSTEMS

[75] Inventors: Stewart Andrew Hurst, Solihull; Anthony John Ainsworth, Essington; John Anthony Bolton, Solihull, all of United Kingdom

[73] Assignee: Lucas Industries PLC, Solihull, United Kingdom

[21] Appl. No.: 586,824

[22] PCT Filed: Aug. 1, 1994

[86] PCT No.: PCT/GB94/01681

§ 371 Date: May 3, 1996

§ 102(e) Date: May 3, 1996

[87] PCT Pub. No.: WO95/03963

PCT Pub. Date: Feb. 9, 1995

[30] Foreign Application Priority Data

Jul. 31, 1993 [GB] United Kingdom .................... 9315893
Dec. 10, 1993 [GB] United Kingdom .................... 9325341

[51] Int. Cl.$^6$ ................................ H02P 5/16; B60T 8/88; B60T 13/16
[52] U.S. Cl. .......................... 318/370; 318/434; 318/371; 303/122.05; 303/122.07; 303/92; 340/660
[58] Field of Search ..................................... 318/430–434, 318/139, 490, 257, 362, 493, 370–380; 303/115.2, 113.4, 10, 155, 92, 20, 122.07, 122.05; 188/181 C; 307/9–13; 340/660

[56] References Cited

U.S. PATENT DOCUMENTS 4,744,041 5/1988 Strunk et al. ............................ 364/565
5,372,410 12/1994 Miller et al. ............................... 303/92
5,558,409 9/1996 Walenty et al. ........................... 303/10
5,572,100 11/1996 Moulton .................................. 318/434

*Primary Examiner*—Paul Ip
*Attorney, Agent, or Firm*—Oblon, Spivak, McClelland, Maier & Neustadt, P.C.

[57] ABSTRACT

A vehicle anti-lock braking (ABS) system having a motor-driven pump (10) for providing a hydraulic supply to the ABS system. The pump motor (10) is controlled by a series device in the form of an electronic switch (16), such as a MOSFET, to enable frequent testing of the motor circuit by short pulses which produce no significant noise. Feedback to control motor speed is obtained by measuring the e.m.f. generated by the motor (16) after it has been switched off and after a delay to allow the back e.m.f., caused by switching off the motor, to decay (preferably to zero) before the measurement operation begins. The generated voltage is integrated during a motor switch-off period, the motor speed being established in this period by subtracting the measured integrated voltage when acting as a generator from the main supply voltage (B+). The ignition switch-controlled supply within the vehicle electrical system only operates a logic gate (40) to control the supply of direct battery power to the vehicle voltage regulator (36), the pump motor circuit and its electronic controller (16) being connected directly to the battery supply (B+) whereby to act as an energy sink to protect all silicon devices in the electrical control system except the ignition circuit logic gate means.

20 Claims, 6 Drawing Sheets

THE 4 TRACES ARE:- 1/ MOFSET CONTROL;
2/ SAMPLE CONTROL
3/ ADC SAMPLE TIME
4/ MOSFET OUTPUT

POINT A IS CLAMP/AVALANCHE VOLTAGE OF MOSFET
B+ IS BATTERY VOLTAGE
C IS THE GENERATED VOLTAGE
D IS THE MOTOR TURNED OFF
E IS THE SAMPLINF SWITCH TURNED ON
F IS WHERE THE SAMPLED VOLTAGE IS MEASURED BY ADC2
AND THE SAMPLING SWITCH TURNED OFF.

VOLTAGE ACROSS MOTOR

TESTING AND SPEED CONTROL OF ELECTRIC MOTORS IN VEHICLES HAVING ELECTRONICALLY CONTROLLED BRAKING SYSTEMS

The present invention relates to the testing and speed control of pump and other electric motors used in vehicles having electronically controlled braking systems.

In the case, for example, of an anti-lock braking system, a pump driven by such a motor provides the hydraulic supply for the ABS system and it is therefore important that the facility be available for testing that the pump motor is operating, or operable, correctly. It is also desirable that the speed of the motor be known and be controllable.

Conventionally, actuation and control of the pump motor is achieved using an electromagnetic relay or electronic switch disposed on the "high side" of the motor, that is, amongst the circuitry connected to that side of the motor winding which is not connected directly to the vehicle chassis (ground). To test that the motor is "in-circuit" and operational, the relay is turned on temporarily. However, because the speed of operation of such a relay is relatively slow, the motor begins to run before the relay can be turned off again. This has a number of disadvantages, including higher noise and cost, inferior testability and pedal feel. Furthermore, the motor must deliver rated output at 8 volts supply, yet be capable of operating for long periods at 16 volts at the extremes of specified temperature.

Conventionally, ABS pump motors are not speed controlled because of the significant cost penalty associated with measuring the motor speed using a separate transducer. This cost limitation leads to high noise levels, inferior pedal feel and potential motor unreliability due to the wide voltage range over which the motor is likely to be operating.

It is therefore an objective of the present invention to provide an alternative means of testing and speed control for motors such as ABS pump motors which enable the aforementioned problems associated with the prior art to be reduced.

It is known from DE-3830164 that the rotational speed of a motor can be established electrically by making use of the fact that the residual magnetisation in the motor permits it to be operated as a generator for a short period of time which is sufficient for measurement. The current supply to the motor is interrupted at the instant of a current zero crossing and the voltage produced by the motor as a result of the residual magnetisation is monitored. The time period from the instant of the last zero crossing of the motor supply voltage to the first voltage zero crossing of the generated voltage is measured as a first time $T_1$, and the time period from the instant of the first voltage zero crossing of the generated voltage to the second voltage zero crossing of the generated voltage is measured as a second time $T_2$. The rotation speed of the motor is calculated using $T_1$ and $T_2$.

It is also known from WO-A-94/07717 that a value for the actual speed of a hydraulic pump, driven by an electric motor energised from a pulsed (interrupted) supply, can be established using only the voltage generated by the motor winding during the disconnection (off) periods.

In accordance with the present invention, there is provided a vehicle electrically controlled braking system having an electric motor connected between a source of voltage and ground and being controlled by opening and closing of a series electronic switch disposed on the "low side" of the motor between the motor and said ground characterised by, for establishing a value for the actual speed of rotation of the motor first means for measuring the supply voltage; second means for measuring the e.m.f. generated by the motor during the disconnection periods of the supply; and calculating means for subtracting the value obtained by the second means from that obtained from the first means to establish said value for the actual speed of rotation of the motor.

Preferably, said first means are adapted to measure the motor e.m.f. in said disconnection periods of the supply only after a delay to enable the back e.m.f caused by switching off the motor, to decay to a predetermined level before the measurement is taken.

Advantageously said predetermined level of back e.m.f. is substantially zero volts, ie only the wanted or desired signal remains.

Preferably, a filter is disposed between the low side of the motor and said second measurement means to achieve the required discrimination, ie said discrimination between desired signal and noise.

Preferably, said series electronic switch is a MOSFET, advantageously an N-channel MOSFET.

Preferably a further filter is included between the high side of the motor and said second measurement means measuring the supply voltage. Advantageously, the second filter is controlled, so as to be operated at substantially the same time as said first mentioned filter. The provision of the second filter gives the benefit of further improvement in signal to noise ratio.

In accordance with a further aspect of the present invention, in a vehicle equipped with an ABS braking system the ignition switch-controlled supply within the vehicle electrical system only operates a logic gate means to control the supply of direct battery power to the vehicle voltage regulator, a circuit for the ABS pump motor circuit and its electronic controller (MOSFET) being connected directly to a battery supply whereby to act as an energy sink to protect all silicon devices in the electrical control system except the ignition circuit logic gate means.

The electronic switch, although preferably a MOSFET or MOSFETS, could be any proprietary "electronic relay" "smart switch", bipolar device or similar fast acting electronic device.

The invention is described further hereinafter, by way of example only, with reference to the accompanying drawings, in which:

FIG. 1 is a circuit diagram illustrating one embodiment of an ABS pump motor control system in accordance with the present invention;

FIG. 2 comprises a series of curves illustrating the operation of part of the apparatus of FIG. 1;

Figure 1:
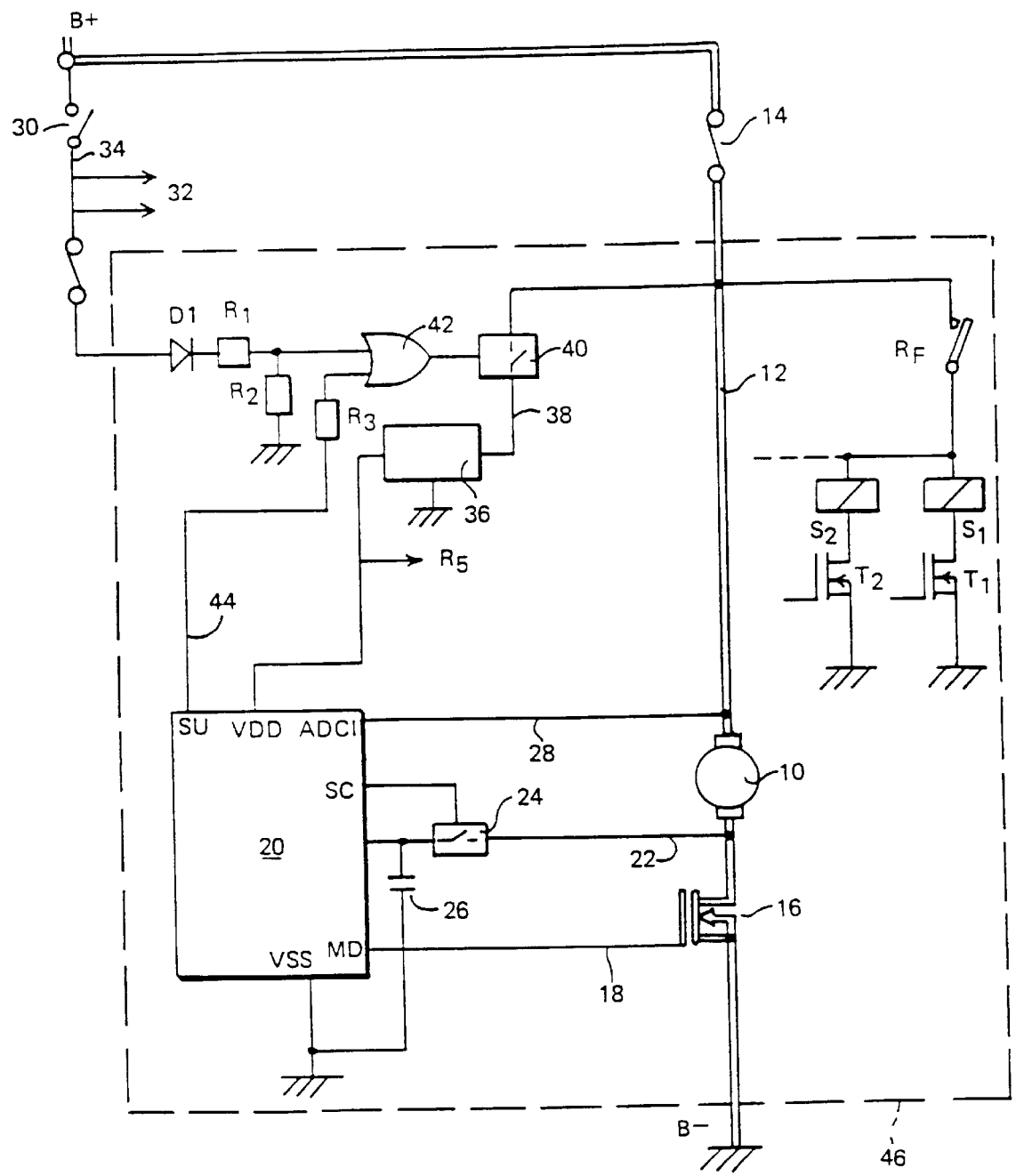
Figure 2A:
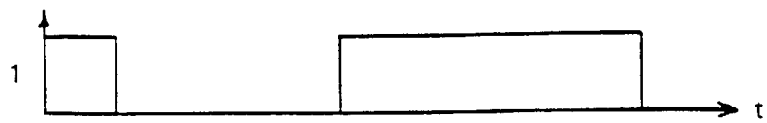
Figure 2B:
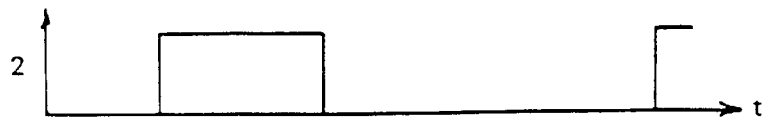
Figure 2C:
Figure 2D:
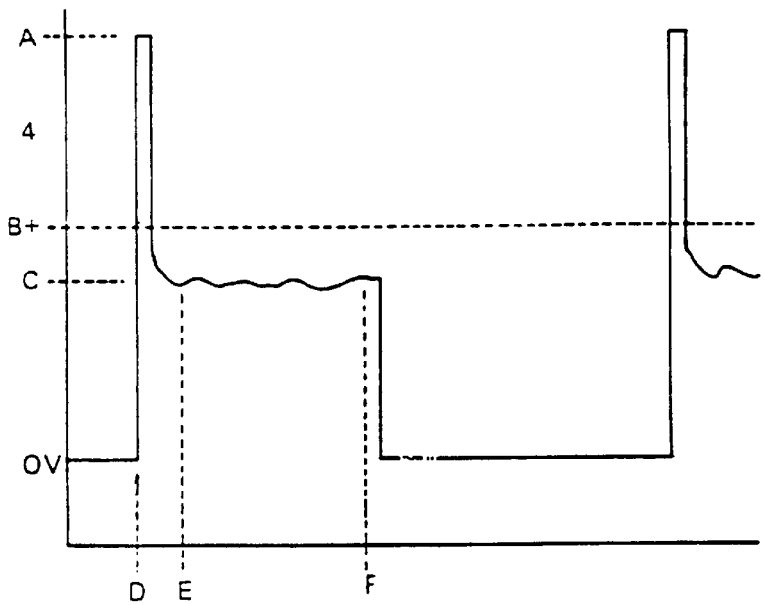

Referring first to FIG. 1, an ABS pump motor 10 is connected at one side to the vehicle battery supply B+via a line 12 containing a fuse 14. The other side of the pump motor is coupled to ground B- by way of a MOSFET 16, preferably of the N-channel type. The drive signal for the MOSFET 16 is supplied by a line 18 from a "motor drive"

output pin MD of a microcontroller unit 20. The pump motor e.m.f. is monitored via a line 22 containing a sampling switch 24, controlled by a "sampler control" output SC of the microcontroller 20, and coupled to a filter formed by a capacitor 26 whose one side is earthed and whose other side is connected to the line 22. The line 22 leads between one side of the motor 10 and an input $ADC_2$ of the microcontroller 20. The other side of the motor is connected to an input $ADC_1$ of the microcontroller 20 by a line 28. For simplicity, a direct connection is shown between the motor and ADC1; in practice, this line (28) would also be filtered and controlled by duplicates of elements 24, 26 and $S_c$.

The vehicle ignition switch 30 is connected in a line 34 to the vehicle supply B+, downstream of the connection of the line 12. Arrows 32 indicate the usual connections to other vehicle loads from the line 34 controlled by the ignition switch. The conventional voltage regulator 36 for generating a regulated supply Rs is energised by the vehicle supply B+ by way of a line 38 coupled to the line 12 and containing a series switch 40 controlled by an OR gate 42. One input of the OR gate 42 is connected firstly to the ignition switch-controlled line 34 carrying a voltage referred to as $b^+$, equal to $B^+$ when the ignition switch is closed via a diode D1 and resistor R1 and secondly to ground via a further resistor R2. The other input of the OR gate 42 is connected by way of a line 44 and resistor $R_3$ to a "supply control" terminal Su of the microcontroller 20.

The ABS system components are those which are enclosed by the chain line 46 and also include output solenoid drive transistors $T_1$, $T_2$... for solenoids $S_1$, $S_2$.... and a failsafe relay $R_F$, again coupled to the line 12 which is independent of the ignition switch 30.

Thus, in the present system, the conventional "high side" pump motor relay or high-side power transistor is replaced by the power MOSFET 16 controlling the motor ground supply. This allows frequent testing of the motor circuit using short pulses which produce no significant noise. The low resistance path of the motor and drive MOSFET allows size and cost reduction of all the output drive transistors $T_1$, $T_2$ etc. Also, the effects on the power supply voltage of alternator voltage ripple, changes in battery load conditions and temperature are overcome by monitoring the motor supply voltage and e.m.f. generated by the motor together, at the same point in time or at least closely together. These effects would otherwise reduce the accuracy of speed detection.

Normally, the power to the active silicon devices in an electronic control unit (ECU) is derived from the Ignition Switch-controlled supply. However, in the illustrated embodiment, the ignition supply $b^+$ only operates the logic switch formed by the OR gate 42 to control the supply of direct battery power to the voltage regulator 36. Hence the motor and MOSFET act as an energy sink to protect all the silicon devices except the ignition input logic gate 42. Because of the low input current resulting in the ignition switch-controlled line 34, the components $D_1$, $R_1$ and $R_2$ can be much smaller and cheaper than is usually the case.

A feedback function to control motor speed is obtained by measuring the e.m.f. generated by the motor after it has been switched off and subtracting this from the supply voltage $B^+$. The drive signal to the motor control FET 16 is arranged to be pulse-width-modulated (PWM) so that the supply voltage is proportional to the ratio of the width of the ON pulses relative to the off pulses. The sampling of the generated e.m.f. is arranged to take place only after the back e.m.f. produced by the Off pulse has diminished sufficiently for the generated e.m.f. of the motor 10 to be measured reliably. This requires filtration of the sampled signal and is performed by the filter capacitor 26. This filtration is arranged to be achieved in such a way that the effect of the conducted emissions normally produced by a PWM motor controller are reduced by a significant amount. The immunity of the controller to external interference is also improved by this filter 26.

A further feature with regard to the synchronously switched filter described above is that the sampling of the generated e.m.f. from the motor 10 via the analogue switch 24 activates the (low-pass) filter 26, which allows a longer time constant to be used for the filter that if it was connected directly to the drain of the FET. The filter capacitor 26 retains a charge voltage corresponding to motor speed during the time that the analogue switch 24 is open circuited, and hence performs a "sample and hold" function, which improves measurement accuracy. Since the filter is connected to the motor only when the motor is switched off, this means that the time constant of the filter is longest when the motor speed is highest, which is advantageous for optimum control of the motor; the filter components can be chosen so that at low speeds, the loading of the filter does not significantly increase the motor response time, whilst at higher speeds optimal filtering of the motor e.m.f. is achieved.

In the present system described above, the generated voltage is integrated over a period of length varying from a fraction of a millisecond to a few milliseconds' during the motor switch-off period: this has the effect of improving the noise immunity, hence accuracy, of the measurement process.

As explained initially hereinbefore, with the conventional motor actuation by a relay, to test that the motor is in-circuit, the relay is turned on. As the speed of operation of a relay is relatively slow, the motor will run before the relay can be turned off.

By using the MOSFET 16, the motor in-circuit test can be performed by test firing the motor with a short duration pulse, such that the microprocessor driving it can "see" a change in state of the monitor line without enough time for the motor to start running.

Using a MOSFET to drive the motor also allows absorption of the load dump energy. This can be achieved in two ways:

1. By allowing the MOSFET and the motor to dissipate the energy by either causing the MOSFET to voltage limit by connecting a zener diode between drain and gate or by letting the MOSFET self avalanche, if a low voltage MOSFET is used. This could however cause excessive heating of the MOSFET.

2. By turning the MOSFET fully on by the microcontroller, so that the motor absorbs all of the energy.

With the second method there is small time delay, between the load dump occurring and the FET turning on. Therefore both methods can be used, such that when the load dump occurs both the MOSFET and the motor absorb the energy until the micro-controller turns the MOSFET fully on so-that the motor then absorbs all of the energy.

As the motor, or motor and MOSFET, are absorbing the load dump energy on the B+ input to the controller, then anything else connected to the B+ line will also be protected. Therefore if the ignition input is used solely as a logic input to switch power from the B+ line, to the controller, then the controller can be turned on and off by the ignition input without high current transient protection.

In the case of the self avalanche rated MOSFET used in conjunction with the micro-controller to turn the device on, this method has the advantage that the components used in the load dump transient protection mode of operation are the same as those used in the normal motor control mode, allowing the circuit to be tested for faults which would otherwise cause the loss of the transient protection. This has the benefit over conventional loaddump clamping devices (such as a zener diode) as they normally only operate during the period of the high voltage condition. As it is unknown when a high voltage condition will occur during normal vehicle operation, it is difficult to confirm that the device is present prior to a transient condition occurring. The invention overcomes this problem by testing this circuit during normal operating mode.

Referring now to FIG. 2, the speed of the motor is determined by filtering and measuring the generated voltage from the motor between points E and F on trace 4. The rate at which the filtered voltage can change is determined by the RC time constant; this only changes between the points E and F as shown on trace 2. Between samples, the previous voltage is held on by the capacitor, which act as a low pass filter. As RFI is usually high frequency and AC coupled, virtually all of the RFI is filtered out.

This filtered voltage is measured by ADC2 as shown on trace 3. This measured voltage is then subtracted from B+as measured by ADC1. This resultant voltage is proportionate to the speed of the motor. The speed of the motor can be kept constant by negative feedback closed loop control by adjusting the mark to space ratio of the Pulse Width Modulated (PWM) on the motor MOSFET drive.

Thus the advantages gained by adopting the features of the present invention include the fact that the motor 10 and its fuse 14 can be checked without affecting system reliability or generating pump noise; the motor and its MOSFET 16 absorb "load dump" energy, thus saving costs in other components; and low-cost closed-loop control of the motor speed which permits system noise reduction, and pedal feel and ABS performance improvements. Furthermore, a smaller motor may be specified than previously because the present motor needs to be specified at, for example, 12 volts, in order to operate without overload at 16 volts. Hence a motor specified at 12 volts is more powerful than required in order to provide the required output at 8 volts. The use of the invention allows the motor to be specified to give rated power output at 8 volts, such. that the motor speed controller then acts as a voltage regulator when the supply is at 16 volts, thus preventing damage to the motor. Still further, the invention enables cost savings in that N-channel MOSFETS may be used directly on the low (ground) side of the motor, thereby overcoming the requirements to use expensive P channel MOSFETS or the additional drive circuitry necessary to use an N-channel device as a high-side switch, eg a charge pump circuit or the like.

In general ABS operation can be performed with the motor operating at a relatively slow speed, hence generating less noise. Only when full hydraulic pump output is required (recognised by ABS control software) will the motor be driven at full power. A further advantage is that a smaller motor can be overdriven for short periods without damage.

Figure 3:
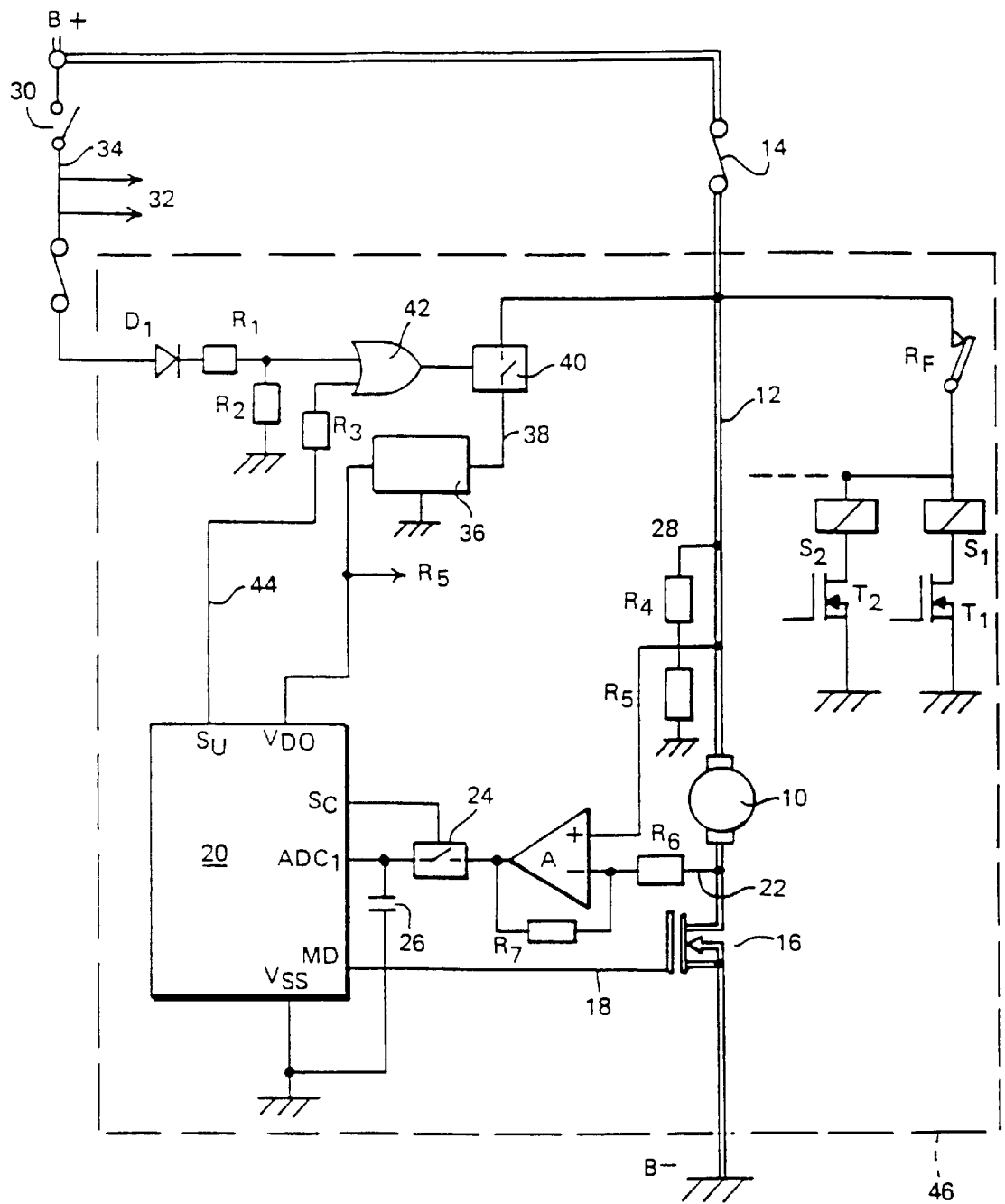
FIG. 3 is a circuit diagram illustrating a second embodiment of an ABS pump motor control system in accordance with the present invention.

Referring now to FIG. 3, there is shown a modification of the arrangement of FIG. 1. In the arrangement of FIG. 1, the motor speed is calculated in software within the microcontroller 20, by subtracting the voltage measured on line 22 via ADC2 from the voltage measured on line 28 via ADC1. In the modified system of FIG. 3, a differential amplifier A is used to calculate the difference between the voltages on lines 22 and 28 representative of motor speed. Resistors $R_4$ and $R_5$ form a precise potentiometer to provide the positive (non-inverting) input to the operational amplifier A, with a signal proportional to the voltage on line 12. Resistors $R_6$ and $R_7$ are also precision resistors to provide the negative (inverting) input to the amplifier A with a signal proportional to the voltage on line 22, and to adjust the close loop feedback of amplifier A in order to present ADC1 with a correctly scaled voltage.

The latter arrangement offers the benefit that only one ADC port is required to perform the relevant function and the software overhead is less.

Figure 4:
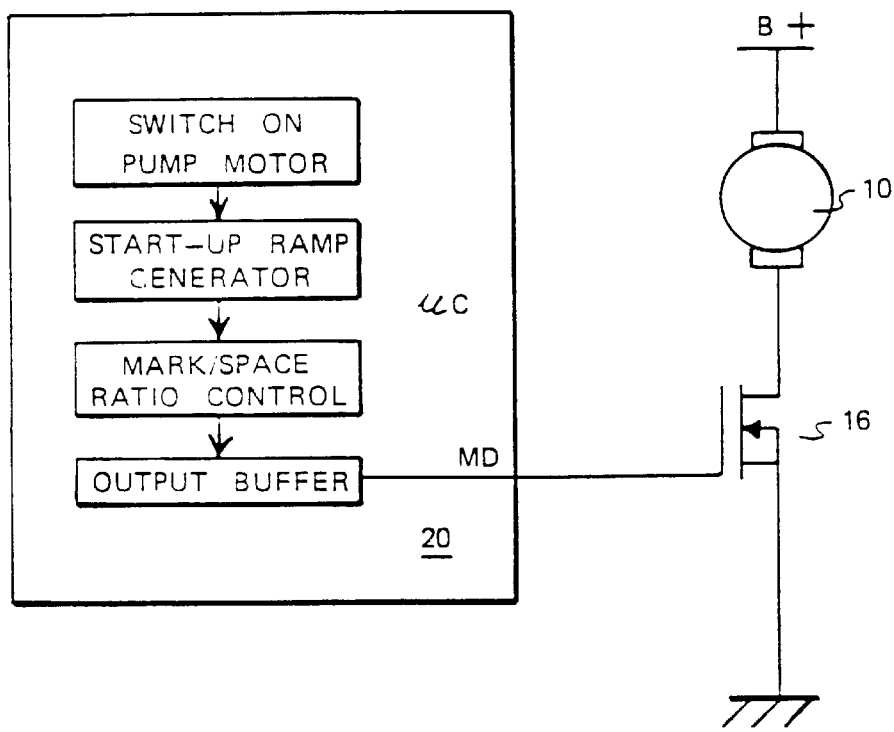
FIG. 4 is a flow diagram illustrating one means of controlling the rate of increase of motor current.
Figure 5:
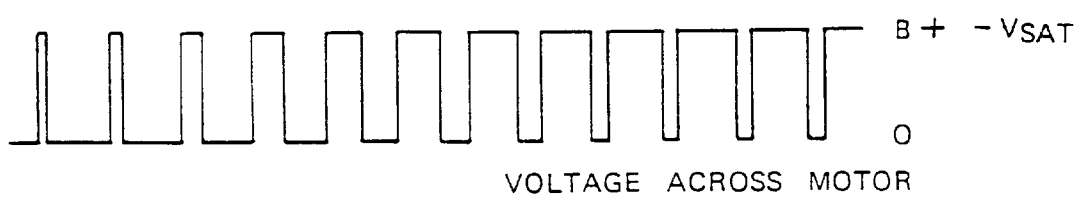
Fig. 5 shows an example of the variable mark space ratio signal across the motor using the arrangement of FIG. 4.

In the arrangement of FIG. 1, the use of a pulse width modulated (PWM) FET 16 to control the motor 10 permits a motor to be used which has a lower voltage rating than is conventionally specified for a 12 volt electrical system (for example 5—8v. compared to 8—16v.). A possible problem in some instances with such an arrangement is that the higher current surge (in rush) associated with a lower operating voltage may lead to a partial demagnetisation of the motor's permanent magnets. This possible problem can be overcome by controlling the initial rate of increase of motor current using software (referred to as softWO start). This can be achieved by increasing the pulse rate of the modulation for a short period of time (e.g. 100 ms) to 100 ps intervals. A simple routine for performing this operation and operating open-loop is illustrated in FIG. 4. On switch-on of the pump motor, a ramp generator is started which adjusts the mark/space ratio of the motor voltage as illustrated in FIG. 5 by way of example via an output buffer and the FET 16. An equivalent function could alternatively be achieved in hardware (not illustrated).

Figure 6:
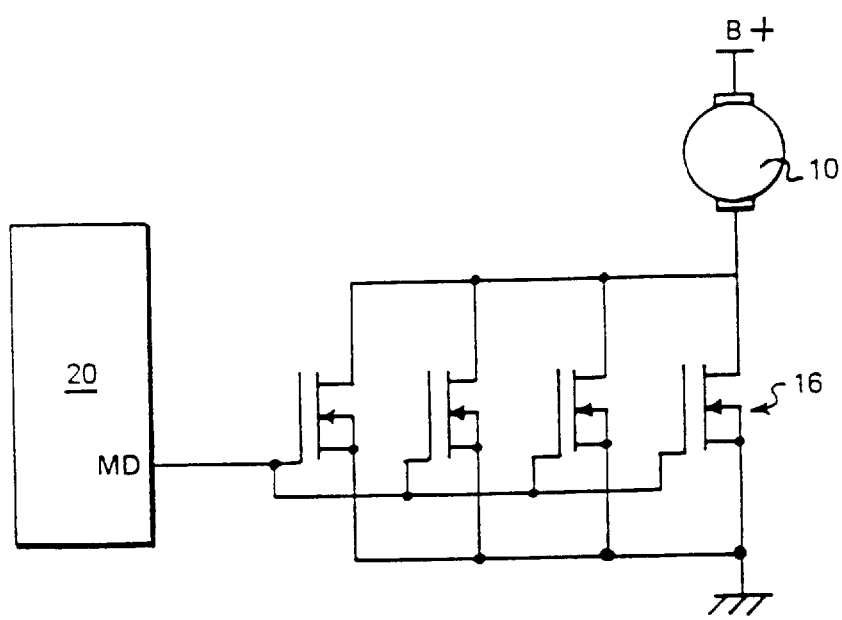
FIG. 6 shows the use of multiple MOSFETS in parallel to control the pump motor.

The basic arrangement of FIG. 1 uses a single MOSFET 16 to control the motor 10. In the alternative arrangement of FIG. 6, the simple MOSFET is replaced by a plurality (four in this case) of similar MOSFETS operating in parallel. An advantage of the latter arrangement is that larger d.c. motors may be controlled than the present "state of the art" allows with a single (relay) device. Furthermore, economies may be made when driving motors of the size associated with the FIG. 1 arrangement, by the substitution of several lower-cost FET devices to replace the single device of FIG. 1.

Figure 7:
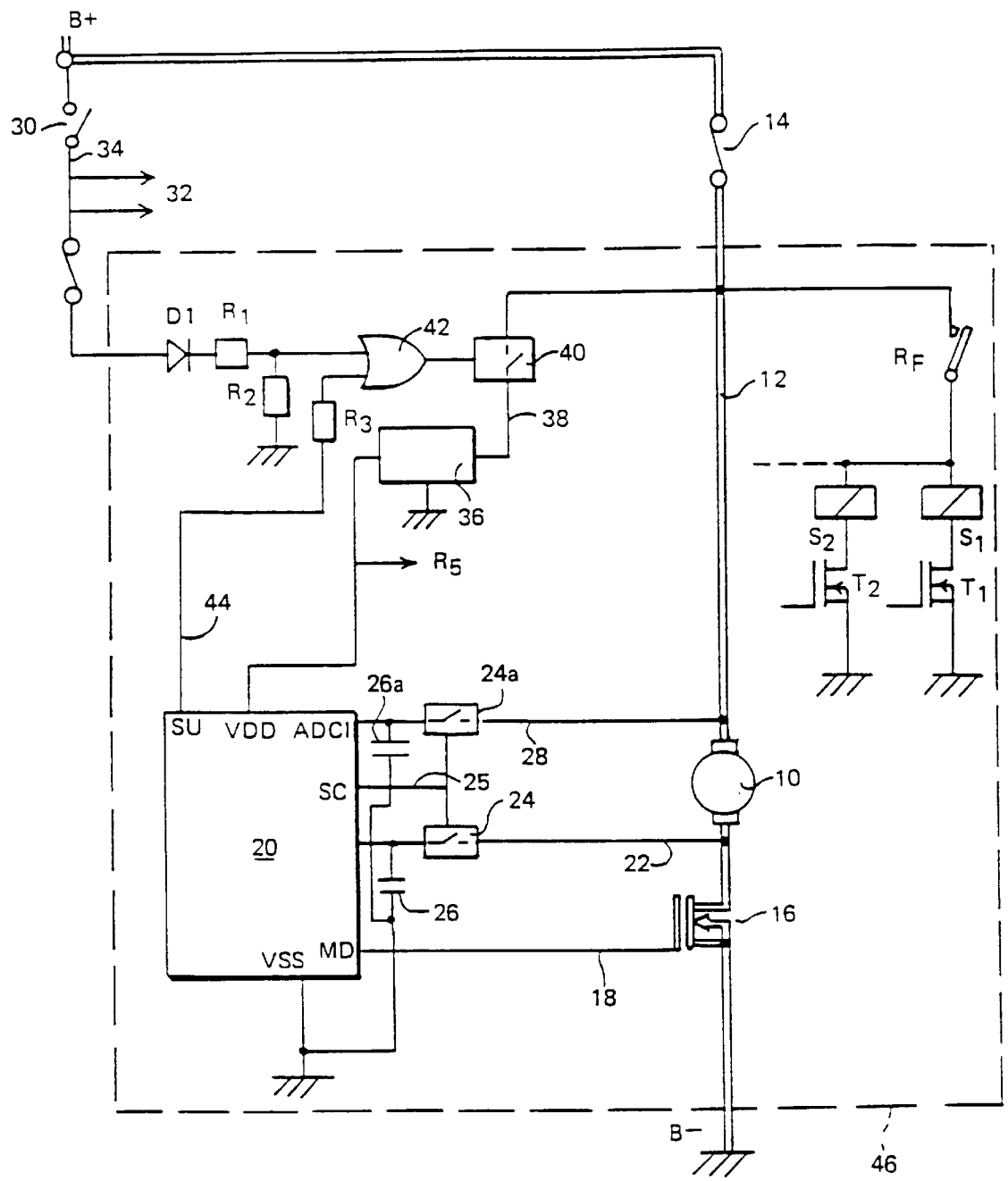
FIG. 7 is a circuit diagram illustrating a second embodiment of an ABS pump motor control system in accordance with the present invention.

The embodiment of FIG. 7 is identical to that of FIG. 1 except for the inclusion of a second filter capacitor 26a, controlled by a second sampler switch 24a, one side of the capacitor 26a being connected to ground and the other side being connected to the line 28 leading from the high side of the motor 10 to the supply voltage measurement input ADC1. The switches 24, 24a are preferably arranged to be operated at substantially identical times by a common control line 25 from the output terminal Sc of the controller unit 20. The provision of this second filter 26a assists in further improving the signal to noise ratio.

We claim:

1. A system for testing the speed of an electric motor in a vehicle electronically controlled braking system comprising:

an electric motor connected between a source of voltage and ground;

an electronic switch connected in seris woth said motor on the "low side " of the motor, between the motor and ground, said switch controlloing the motor by connnecting and disconnecting the motor to ground by opening and closing the switch;

first means connected to the source of voltage for measuring the supply voltage;

second means connected between the motor and the switch for measuring the e.m.f. generated by the motor during disconnection periods; and calculating means for subtracting a value obtained by the second means form the value obtained from the first means to determne the actual speed of rotation of the motor.

2. A system as claimed in claim 1, wherein said first means are adapted to measure the motor e.m.f. in said disconnection periods of the supply only after a delay to enable the back e.m.f. caused by switching off the motor, to decay to a predetermined level or for a predetermined time before the measurement is taken.

3. A system as claimed in claim 2, wherein aid predetermined level of the back e.m.f. is substantially zero volts.

4. A system as claimed in claim 2 wherein a filter is disposed between the low side of the motor and said second measurement means to achieved said discrimination between desired signal and noise.

5. A system as claimed in claim 4, wherein a further filter is disposed between the high side of the motor and said second measurement means measuring the supply voltage.

6. A system as claimed in claim 5, wherein said further filter is controlled so as to be operate at substantially the same time as said firstmentioned filter .

7. A system as claimed in claim 1, wherein pulse width modulated control of motor speed is adopted, using said motor speed value obtained by said calculating means as a feedbac signal.

8. A system as claimed in claim 1, wherein said series electronic switch is a MOSFET.

9. A system as claimed in claim 1 wherein said series electronic switch is an N-channel MOSFET.

10. A system as claimed in claim 1 wherein said series electronic switch comprises a plurality of MOSFETS in parallel.

11. A vehicle having an anti-lock braking system which included an ABS pump driven by said electric motor, and system as claimed-in claim 1, wherein the electrical supply controlled by a vehicle ignition switch only operates a logic gate means to control the supply of direct battery power to the vehicle voltage regulator the circuit for the ABS pump motor and its electronic control switch being connected directly to the battery supply , independently of the ignition switch whereby to act as an energy sink to protect all silicon devices in the vehicle electrical control system except said ignition circuit logic gate means .

12. A system for protecting an ABS braking sytem in a vehicle comprising:

an ABS pump motor and an electronic controller for the pump motor being connected directly to a battery supply;

an ignition switch-controlled supply connected to the battery power;

a logic gate means connected to said ignition switch-controlled supply, said logic gate means controlling the supply of battery power to a voltage regulator;

wherein the motor and control act as an energy sink to protect silicon devices in electronical control systems of the vehicle execpt for the logic gate means.

13. A system as claimed in claim 1 adapted for anti-lock (ABS) braking and having an ABS pump driven by said electric motor for providing a hydraulic supply to the ABS system.

14. A system as claimed in claim 3, wherein a filter is disposed between the low side of the motor and said second measurement means to achieved said discrimination between desired signal and noise.

15. A system as claimed in claim 2, wherein pulse width modulaated control of motor speed calculating means as a feedback signal.

16. A system as claimed in claim 3,wherein pulse width codulated control of motor speed os adopted, using said motor speed value obtained by said calculating means as a feedback signal.

17. A system as claimed in claim 4, wherein pulse width modulated control of motor speed is adopted, using said motor speed value obtained by said calculating means as a feedback siganal.

18. A system as claimed in claim 4, wherein pulse width modulated control of motor speed is adopted, using said motor speed value obtianed by said calculating means as a feedback signal.

19. A system as claimed in claim 6, whereun pulse width modulated control of motor speed is adopted, suing said motor speed value obtained by saidcalcualting means as a feedback signal.

20. A system as claimed in claim 2, wherein said seris electronic switch is a MOSFET.

* * * * *